US012805525B2

(12) United States Patent
Gries et al.

(10) Patent No.: US 12,805,525 B2
(45) **Date of Patent: *Nov. 24, 2026**

(54) ATTRACTANTS FOR RODENTS

(71) Applicant: Gerhard Gries, Coquitlam (CA)

(72) Inventors: Gerhard Gries, Coquitlam (CA); Stephen J. Takacs, Hope (CA); Regine Gries, Coquitlam (CA)

( * ) Notice: Subject to any disclaimer, the term of this patent is extended or adjusted under 35 U.S.C. 154(b) by 1126 days.

This patent is subject to a terminal disclaimer.

(21) Appl. No.: 17/536,605

(22) Filed: Nov. 29, 2021

(65) Prior Publication Data

US 2022/0142166 A1 May 12, 2022

Related U.S. Application Data

(63) Continuation of application No. 16/302,900, filed as application No. PCT/CA2017/050618 on May 23, 2017, now Pat. No. 11,185,077.

(60) Provisional application No. 62/340,434, filed on May 23, 2016.

(51) Int. Cl.

| | |
|---|---|
| ***A01N 45/00*** | (2006.01) |
| ***A01M 25/00*** | (2006.01) |
| ***A01N 25/00*** | (2006.01) |

(52) U.S. Cl.

CPC ............. *A01N 45/00* (2013.01); *A01M 25/00* (2013.01); *A01M 25/004* (2013.01); *A01N 25/004* (2013.01)

(58) Field of Classification Search

CPC combination set(s) only.

See application file for complete search history.

(56) References Cited

U.S. PATENT DOCUMENTS

| | | | | |
|---|---|---|---|---|
| 5,672,628 | A * | 9/1997 | Heiskanen | A01N 25/004 514/648 |
| 11,185,077 | B2 * | 11/2021 | Gries | A01M 25/004 |
| 12,207,642 | B2 * | 1/2025 | Varner | A01N 45/02 |
| 2015/0128480 | A1 * | 5/2015 | Pinder | A01M 23/14 43/69 |

FOREIGN PATENT DOCUMENTS

| | | |
|---|---|---|
| CA | 856218 | * 11/1970 |
| FR | 2641943 | * 7/1990 |

OTHER PUBLICATIONS

Machine translation of FR 2641943, Jul. 27, 1990.*

Takacs, S. et al., "The sex attractant pheromone of male brown rats: identification and field experiment," Angewandte Chemie International Edition, vol. 55, May 10, 2016.*

* cited by examiner

*Primary Examiner* — John Pak

(74) *Attorney, Agent, or Firm* — FBT Gibbons LLP

(57) ABSTRACT

Methods of using compositions attractive to rodents, such as mice and rats, are disclosed. The compositions include one or more of androstenone, testosterone, progesterone, and estrogen. The compositions can further include at least one of a lethal agent or a chemosterilant. The androstenone, testosterone, progesterone, and estrogen are isolated, purified, and/or synthetic.

20 Claims, 8 Drawing Sheets

ATTRACTANTS FOR RODENTS

REFERENCE TO RELATED APPLICATIONS

The present application is a continuation of U.S. patent application Ser. No. 16/302,900, filed Nov. 19, 2018, now U.S. Pat. No. 11,185,077, issued Nov. 30, 2021, which is a national stage application under 35 U.S.C. § 371 of International Application No. PCT/CA2017/050618, filed May 23, 2017, which claims the priority benefit of U.S. Provisional Application No. 62/340,434, filed May 23, 2016, and hereby incorporates the same applications herein by reference in its entirety their entireties.

TECHNICAL FIELD

The present disclosure generally relates to compositions for attracting mice and rats. The compositions can include testosterone, androstenone, progesterone, and/or estrogen.

BACKGROUND

Rodents are global pests. For example, mice and rats cause damage by soiling food, spreading allergens, diminishing yields of agricultural crops, serving as reservoirs for disease-causing pathogens, endangering island seabird colonies, and by acting as an invasive species harming indigenous fauna (Wanless et al. 2007, Angel et al. 2009). These many adverse effects have prompted ongoing efforts to trap and poison rodents. However, rodents can exhibit neophobia (the fear of new objects). The lag time for neophobic rodents to become conditioned to the presence of newly placed traps, or trap boxes containing snap traps, and to enter them greatly reduces the effectiveness of rodent control efforts.

SUMMARY

According to one embodiment, a composition includes one or more of androstenone, testosterone, progesterone, and estrogen and at least one of a lethal agent or a chemosterilant. The one or more of androstenone, testosterone, progesterone, and estrogen are isolated, purified, synthetic, or a combination thereof.

According to another embodiment, a device for attracting a rodent includes a housing for receiving the rodent, and a composition. The composition is adjacent to or included within the housing. The composition includes one or more of androstenone, testosterone, progesterone, and estrogen. The one or more of androstenone, testosterone, progesterone, and estrogen are isolated, purified, synthetic, or a combination thereof.

According to another embodiment, a device for attracting a rodent includes a trap and a composition. The composition is adjacent to or included within the trap. The composition includes one or more of androstenone, testosterone, progesterone, and estrogen. The one or more of androstenone, testosterone, progesterone, and estrogen are isolated, purified, synthetic, or a combination thereof.

According to another embodiment, a method of attracting a rodent includes providing a composition. The composition includes one or more of androstenone, testosterone, progesterone, and estrogen. The one or more of androstenone, testosterone, progesterone, and estrogen are isolated, purified, synthetic, or a combination thereof.

According to another embodiment, a method for immobilizing a rodent includes providing a device and dispensing a composition adjacent to or included within the device. The composition includes one or more of androstenone, testosterone, progesterone, and estrogen. The one or more of androstenone, testosterone, progesterone, and estrogen are isolated, purified, synthetic, or a combination thereof.

DETAILED DESCRIPTION

Figure 1:
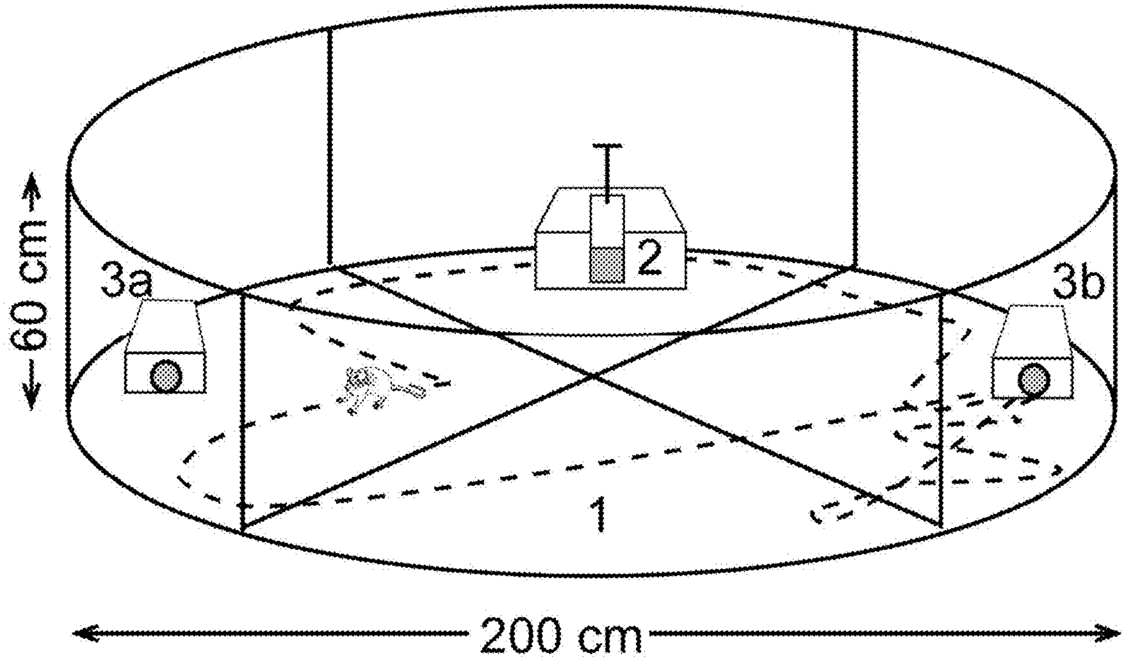
FIG. 1 depicts an experimental design to evaluate the behavioral responses of rats.

The term "isolated" as used herein means separated from materials with which the compound is normally associated in a native state.

The term "purified" as used herein refers to material that has been isolated under conditions that reduce, or eliminate, the presence of unrelated materials, i.e., contaminants, including native materials from which the material is obtained. Purified material substantially free of contaminants can be 50% or more pure; about 90% or more pure, or about 99% or more pure. Purity can be evaluated by methods known in the art.

The term "synthetic" as used herein means artificially produced by chemical processes or other processes initiated by human energy, as opposed to compounds formed by natural processes.

The term "lethal" as used herein means sufficient to result in immobilization, knockdown and/or death of 50% or more, 55% or more, 60% or more, 65% or more, 70% or more, 75% or more, 80% or more, 85% or more, 90% or more, 95% or more, or 99% or more, rodents.

The term "lethal agent" as used herein means an agent that is capable of immobilizing, knocking down, and/or killing 50% or more, 55% or more, 60% or more, 65% or more, 70% or more, 75% or more, 80% or more, 85% or more, 90% or more, 95% or more, or 99% or more, rodents that are exposed to an appropriate dose, number or intensity over an appropriate amount of time.

The term "attractant" as used herein refers to any composition or formulation that makes attractive to a rodent a habitat, food source, or other site which may be frequented or traversed by a mouse or a rat.

The term "chemosterilant" as used herein means a substance that is capable of sterilizing 50% or more, 55% or more, 60% or more, 65% or more, 70% or more, 75% or more, 80% or more, 85% or more, 90% or more, 95% or more, or 99% or more, of male or female rodents that are exposed to an appropriate dose, number or intensity of the substance over an appropriate amount of time.

The term "rodent" as used herein refers to a rodent. The term "mouse" as used herein refers to at least one mouse of the genus *Mus*, including the house mouse (*Mus musculus*). The mouse can be male or female. The term "rat" as used herein refers to at least one rat of the genus *Rattus* including the brown rat (*Rattus norvegicus*) or the black rat, or roof rat, (*Rattus rattus*). The rat can be male or female.

The term "androstenone" as used herein refers to 5α-androst-16-en-3-one. The term "testosterone" as used herein refers to (8R,9S,10R,13S,14S,17S)-17-hydroxy-10,13-dimethyl-1,2,6,7,8,9,11,12,14,15,16,17-dodecahydrocyclopenta[a]phenanthren-3-one. The term "progesterone" as used herein refers to 8S,9S,10R,13S,14S,17S)-17-acetyl-10,13-dimethyl-1,2,6,7,8,9,11,12,14,15,16,17-dodecahydrocyclopenta[a]phenanthren-3-one. The term "estrogen" as used herein refers to (8R,9S,13S,14S,17S)-13-methyl-6,7,8,9,11,12,14,15,16,17-decahydrocyclopenta[a]phenanthrene-3,17-diol. The term "estrogen" further includes estradiol.

Unless otherwise specifically disclosed, materials for making components of the device of the present disclosure can be selected from appropriate materials, such as metal, metal alloys, natural or manmade fibers, composites, vinyl, plastics, silicone, rubber, and the like. Any and all appropriate manufacturing or production methods, such as casting, pressing, extruding, molding, or machining can be used to construct exemplary devices, embodiments, or their components.

Exemplary embodiments of the disclosure will now be described more fully with reference to the accompanying drawings. In certain embodiments, a composition for attracting a rodent is provided. In certain embodiments, the composition can include one or more of testosterone, androstenone, progesterone, and estrogen. The testosterone, androstenone, progesterone, and estrogen can be isolated, purified, and/or synthetic.

In certain embodiments, the composition can include one or more of testosterone, androstenone, progesterone, and estrogen, and the composition can be useful for attracting a rodent. In certain embodiments, the composition can attract a female rodent. In certain embodiments, the composition can attract a male rodent.

In certain embodiments, the composition can include one or more of testosterone, androstenone, progesterone, and estrogen and one or more lethal agents and chemosterilants.

In certain embodiments, the lethal agent can be a chemical that is capable of causing immobilization and/or death of one or more rodents. For example, the chemical can be one or more of an anticoagulant and/or a toxicant. In certain embodiments, suitable anticoagulants can include warfarin ((RS)-4-hydroxy-3-(3-oxo-1-phenylbutyl)-2H-chromen-2-one), chlorophacinone (2-[2-(4-chlorophenyl)-1-oxo-2-phenylethyl]indane-1,3-dione), diphacinone (2-(diphenylacetyl)-1H-indene-1,3(2H)-dione), bromadiolone (3-[3-[4-(4-bromophenyl)phenyl]-3-hydroxy-1-phenylpropyl]-2-hydroxychromen-4-one), difethialone (3-[3-[4-(4-bromophenyl)phenyl]-1-tetralinyl]-2-hydroxy-4-thiochromenone), brodifacoum (3-[3-[4-(4-bromophenyl)phenyl]-1,2,3,4-tetrahydronaphthalen-1-yl]-2-hydroxychromen-4-one), and combinations thereof. In certain embodiments, suitable toxicants can include bromethalin (N-methyl-2,4-dinitro-6-(trifluoromethyl)-N-(2',4',6'-tribromophenyl)aniline), cholecalciferol ((3β,5Z,7E)-9,10-secocholesta-5,7,10(19)-trien-3-ol), zinc phosphide (zinc phosphide/trizinc diphosphide), strychnine (strychnidin-10-one), alphachloralose, and combinations thereof. As can be appreciated, a lethal agent can be provided in any suitable manner. For example, the lethal agent can be mixed with the composition. In certain embodiments, the lethal agent can be microencapsulated.

In certain embodiments, a chemosterilant can be a chemical that is capable of sterilizing a female rodent. For example, the chemical can include one or more of mestranol, quinoestrol, diethylstilbestrol, methyl testosterone, the 3-cyclopentyl ester of 17α-hexa-1'3'-diynyloestra-1,3,5(10)-trien-17β-ol, α-chlorhydrin, or 4-vinylcyclohexene diepoxide. Alternatively, the chemical can be capable of sterilizing a male rodent. Examples of such chemicals can include one or more of bicalutimide, degarelex, estrogen, flutamide, goserelin, ketoconazol, leuprolide, medroxypregesterone, nilutimide, orntide acetate, or triptorelin.

In certain embodiments, the composition can further include one or more food baits. Suitable food baits can include natural foodstuffs such as meat, cheese, eggs, nuts, and/or grains. For example, suitable food baits can include lard and cracklings, cereal flour (e.g., oat flour and/or rice flour), cereal bran (e.g., wheat bran), gelling agent(s) (e.g., gelatin and/or agar), sugar (e.g., fructose), oil(s) (e.g., safflower oil), emulsifier(s) (e.g., soy lecithin) and humectant (s) (e.g., carrageenan gum powder), water, chemical attractants (e.g., 2-hydroxy-3-methylcyclopent-2-en-1-one, 2,3-butadione, 3-methylbutanal, 5-methyl-(E)-2-hepten-4-one, 3-methyl-4-heptanone, γ-octalactone and/or butyric acid), and combinations thereof.

Additionally, or alternatively, volatile pheromone components attractive to female mice, female rats, or male rats can be included. For example, one or more of 3,4-dehydro-exo-brevicomin and 2-sec-butyl-4,5-dihydrothiazole can be included in compositions attractive to female mice. Compositions attractive to female rats, can include one or more of 2-heptanone, 4-heptanone, 3-ethyl-2-heptanone, 2-octanone, 2-nonanone and 4-nonanone in certain embodiments. Compositions attractive to male rats can include one or more of 2-methyl-butyric acid, 3-methyl-butyric acid, heptanal, hexanoic acid, benzaldehyde, benzyl alcohol, 2-phenylacetaldehyde, nonanal and decanal in certain embodiments.

In certain embodiments, the compositions described herein can be used to attract one or more rodents. In certain embodiments, a composition including one or more of testosterone, androstenone, progesterone, and estrogen can be used to attract one or more rodents. The composition can be used as a bait, and, optionally, can be included in a trap. In certain embodiments, a composition consisting essentially of one or more of testosterone, androstenone, progesterone, and estrogen can be used to attract one or more rodents. In a certain embodiment, a composition consisting of one or more of testosterone, androstenone, progesterone, and estrogen can be used to attract one or more rodents. For example, a composition consisting of one, or two, of testosterone, androstenone, progesterone, and estrogen can be used to attract one or more rodents. In certain embodiments, three, or more, of testosterone, androstenone, progesterone, and estrogen can be used to attract one or more rodents. The testosterone, androstenone, progesterone and estrogen can be isolated, purified, and/or synthetic.

In certain embodiments, a composition including one or more of testosterone, androstenone, progesterone, and estrogen in an amount of about 0.0000001% to about 99% of the composition can be used to attract a rodent. For example, one or more of testosterone, androstenone, progesterone, and estrogen can be included at about 0.0000001%, about 0.000001%, about 0.00001%, about 0.0001%, about 0.0005%, about 0.001%, about 0.005%, about 0.01%, about 0.05%, about 0.1%, about 0.5%, about 1%, about 2%, about 5%, about 7.5%, about 10%, about 12.5%, about 15%, about 17.5%, about 20%, about 22.5%, about 25%, about 27.5%, about 30%, about 32.5%, about 35%, about 37.5%, about 40%, about 42.5%, about 45%, about 47.5%, about 50%, about 52.5%, about 55%, about 57.5%, about 60%, about 62.5%, about 65%, about 67.5%, about 70%, about 72.5%, about 75%, about 77.5%, about 80%, about 82.5%, about 85%, about 87.5%, about 90%, about 92.5%, about 95%, about 97.5%, or about 99% by weight of the composition. In certain embodiments, one or more of testosterone, androstenone, progesterone, and estrogen can be included in an amount of about 0.0001% to 10.0% by weight of the composition. For example, one or more of testosterone, androstenone, progesterone, and estrogen can be included in an amount of about 0.0000001% to about 10%, about 0.0000001% to about 5%, about 0.0000001% to about 1%, about 0.000001% to about 10%, about 0.000001% to about 5%, about 0.000001% to about 1%, about 0.00001% to about 10%, about 0.00001 to about 5%, about 0.00001% to about 1%, about 0.0001% to about 5%, about 0.0001% to about 1%, about 0.001% to about 10%, about 0.001% to about 5%, or about 0.001% to about 1%.

In certain embodiments, one or more of testosterone, androstenone, progesterone, and estrogen can included in an amount of about 1% or less, about 2% or less, about 5% or less, about 7.5% or less, about 10% or less, about 12.5% or less, about 15% or less, about 17.5% or less, about 20% or less, about 22.5% or less, about 25% or less, about 27.5% or less, about 30% or less, about 32.5% or less, about 35% or less, about 37.5% or less, about 40% or less, about 42.5% or less, about 45% or less, about 47.5% or less, about 50% or less, about 52.5% or less, about 55% or less, about 57.5% or less, about 60% or less, about 62.5% or less, about 65% or less, about 67.5% or less, about 70% or less, about 72.5% or less, about 75% or less, about 77.5% or less, about 80% or less, about 82.5% or less, about 85% or less, about 87.5% or less, about 90% or less, about 92.5% or less, about 95% or less, about 97.5% or less, and about 99% or less, by weight of the composition. The composition can be used as a bait, and optionally, can be included in a trap. The testosterone, androstenone, progesterone, and estrogen can be isolated, purified, and/or synthetic.

In certain embodiments described herein, a composition can further include one or more lethal agents in an amount of about 1% to about 99% of the composition. The lethal agent can be a chemical that is capable of immobilizing and/or killing a rodent. In certain embodiments, the lethal agent(s) can be included in an amount of about 1% or more, about 2% or more, about 5% or more, about 7.5% or more, about 10% or more, about 12.5% or more, about 15% or more, about 17.5% or more, about 20% or more, about 22.5% or more, about 25% or more, about 27.5% or more, about 30% or more, about 32.5% or more, about 35% or more, about 37.5% or more, about 40% or more, about 42.5% or more, about 45% or more, about 47.5% or more, about 50% or more, about 52.5% or more, about 55% or more, about 57.5% or more, about 60% or more, about 62.5% or more, about 65% or more, about 67.5% or more, about 70% or more, about 72.5% or more, about 75% or more, about 77.5% or more, about 80% or more, about 82.5% or more, about 85% or more, about 87.5% or more, about 90% or more, about 92.5% or more, about 95% or more, about 97.5% or more, and about 99% or more, by weight of the composition.

In certain embodiments, the lethal agent(s) can be included in an amount of about 1% or less, about 2% or less, about 5% or less, about 7.5% or less, about 10% or less, about 12.5% or less, about 15% or less, about 17.5% or less, about 20% or less, about 22.5% or less, about 25% or less, about 27.5% or less, about 30% or less, about 32.5% or less, about 35% or less, about 37.5% or less, about 40% or less, about 42.5% or less, about 45% or less, about 47.5% or less, about 50% or less, about 52.5% or less, about 55% or less, about 57.5% or less, about 60% or less, about 62.5% or less, about 65% or less, about 67.5% or less, about 70% or less, about 72.5% or less, about 75% or less, about 77.5% or less, about 80% or less, about 82.5% or less, about 85% or less, about 87.5% or less, about 90% or less, about 92.5% or less, about 95% or less, about 97.5% or less, and about 99% or less, by weight of the composition.

In certain embodiments, a composition can also include one or more chemosterilants in an amount of about 1% to about 99% of the composition. The chemosterilant(s) can be a chemical that is capable of sterilizing a rodent. The rodent can be a female rodent or a male rodent. In certain embodiments, the chemosterilant(s) can be included in an amount of about 1% or more, about 2% or more, about 5% or more, about 7.5% or more, about 10% or more, about 12.5% or more, about 15% or more, about 17.5% or more, about 20% or more, about 22.5% or more, about 25% or more, about 27.5% or more, about 30% or more, about 32.5% or more, about 35% or more, about 37.5% or more, about 40% or more, about 42.5% or more, about 45% or more, about 47.5% or more, about 50% or more, about 52.5% or more, about 55% or more, about 57.5% or more, about 60% or more, about 62.5% or more, about 65% or more, about 67.5% or more, about 70% or more, about 72.5% or more, about 75% or more, about 77.5% or more, about 80% or more, about 82.5% or more, about 85% or more, about 87.5% or more, about 90% or more, about 92.5% or more, about 95% or more, about 97.5% or more, and about 99% or more, by weight of the composition.

In certain embodiments, the chemosterilant(s) can be included in an amount of about 1% or less, about 2% or less, about 5% or less, about 7.5% or less, about 10% or less, about 12.5% or less, about 15% or less, about 17.5% or less, about 20% or less, about 22.5% or less, about 25% or less, about 27.5% or less, about 30% or less, about 32.5% or less, about 35% or less, about 37.5% or less, about 40% or less, about 42.5% or less, about 45% or less, about 47.5% or less, about 50% or less, about 52.5% or less, about 55% or less, about 57.5% or less, about 60% or less, about 62.5% or less, about 65% or less, about 67.5% or less, about 70% or less, about 72.5% or less, about 75% or less, about 77.5% or less, about 80% or less, about 82.5% or less, about 85% or less, about 87.5% or less, about 90% or less, about 92.5% or less, about 95% or less, about 97.5% or less, and about 99% or less, by weight of the composition.

In certain embodiments, a composition described herein can consist of no more than two of testosterone, androstenone, progesterone, and estrogen. The testosterone, androstenone, progesterone, and estrogen can be isolated, purified, and/or synthetic.

In certain embodiments, a composition can consist essentially of no more than two of testosterone, androstenone, progesterone, and estrogen and a lethal agent. In certain embodiments, a composition can include two or more of testosterone, androstenone, progesterone, and estrogen and a lethal agent. The testosterone, androstenone, progesterone, and estrogen can be isolated, purified, and/or synthetic.

In certain embodiments, a composition can consist essentially of no more than two of testosterone, androstenone, progesterone, and estrogen and a chemosterilant. In certain embodiments, a composition can include two or more of testosterone, androstenone, progesterone, and estrogen and a chemosterilant. The testosterone, androstenone, progesterone, and estrogen can be isolated, purified, and/or synthetic.

In certain embodiments, a composition that can attract a rodent can be formulated as a granule, a solid block, a gel, a powder, a paste, a liquid, or as combinations thereof.

Any of the compositions described herein can be included in a device for attracting a rodent. The device can include a composition including one or more of testosterone, androstenone, progesterone, and estrogen and, optionally, one or more of lethal agents and chemosterilants. In certain embodiments, the device can include a housing for receiving a rodent. The composition can be adjacent to, or included within, the housing. The housing can also include a food bait that can be adjacent to, or included within, the composition. The housing can allow a rodent to enter and leave the device after ingesting the composition. As can be appreciated, the housing can be configured so that a rodent can enter the device, but other animals are less likely to be able to enter the device. For example, the housing can contain a size-restrictive entryway and additionally, or alternatively, include a sharp turn. The device can be reusable (e.g., rebaitable or resettable) or be for single-use. In certain embodiments, the device can include a trap that is capable of trapping more than one rodent and/or capable of trapping and killing more than one rodent.

In certain embodiments, the device for attracting one or more rodents can be a device that is capable of producing an acoustic signal to attract rodents. Such devices are described, for example, in U.S. Publication No. 2015/0128479, the disclosure of which is incorporated herein in its entirety.

A device for attracting a rodent can include an attractant compound that is capable of attracting a rodent.

A device for attracting one or more female mice can include one or more of 3,4-dehydro-exo-brevicomin and 2-sec-butyl-4,5-dihydrothiazole in certain embodiments.

A device for attracting one or more female rats can include one or more of 2-heptanone, 4-heptanone, 3-ethyl-2-heptanone, 2-octanone, 2-nonanone and 4-nonanone in certain embodiments.

A device for attracting one or more male rats can include one or more of 2-methyl-butyric acid, 3-methyl-butyric acid, heptanal, hexanoic acid, benzaldehyde, benzyl alcohol, 2-phenylacetaldehyde, nonanal and decanal in certain embodiments.

In certain embodiments, a device can also include a trap. The trap can be an immobilizing trap (e.g., a sticky trap or a chamber trap), an impaling trap, a snap trap, an asphyxiation trap (e.g., a drowning trap, or a noose-based trap), an electrocution trap, a skull-fracturing piston trap, a crushing trap, a catch-and-release trap, a self-resetting trap capable of multiple killings, or combinations thereof.

As can be appreciated, the device can trap, or kill, more than one rodent in certain embodiments. For example, a device for attracting one or more rodents can include multiple single-use traps, a plurality of chambers that can each trap one rodent, or a single chamber that can trap or kill multiple rodents in various embodiments.

Other variations to the device are also possible in certain embodiments. For example, a device can automatically kill and remove a rodent in certain examples. In such examples, a rodent can be lured into a housing containing a trap that kills the rodent using, for example, an impaling trap, a compression trap, an asphyxiation trap, an electrocution trap, or a skull-fracturing piston trap. Once the rodent has been killed, the trap can reset itself by releasing the rodent to fall out of both the trap housing and device. As can be appreciated, such devices can kill multiple rodents without human intervention. In certain embodiments, such devices can be mechanically powered (using e.g., a compressed gas cartridge) or can be electrically powered.

As can be appreciated, other devices are also possible in certain embodiments. For example, in certain embodiments, a device for attracting rodents can be a dispensing device or a dispersing device which dispenses, or disperses, a composition as described herein. As can be appreciated, the composition in such embodiments can be an aerosolized liquid, a gel, a solid product such as a granule, or the like. As can be further appreciated, the method of application is not particularly limited and can be supplied as a ready to spray liquid trigger dispenser, in a paste syringe dispenser, or in any other known dispenser in various embodiments.

In certain embodiments, a device can include a housing for receiving a rodent, as well as a composition including one or more of testosterone, androstenone, progesterone, and estrogen.

Any of the embodiments described herein can be used to attract a rodent. The rodent can also be immobilized and/or killed by providing any of the compositions described herein with a lethal agent. The rodent can also be sterilized by providing any of the compositions described herein with a chemosterilant. The composition can be provided in a dose that is sufficient to result in the attraction, and optionally, the sterilization and/or immobilization and/or death of the rodent.

EXAMPLES

Source and Maintenance of Rat Colony

Brown rats, *Rattus norvegicus* (strain: BN; UACC protocol number 958-10), were obtained from Charles River Laboratories Ltd (Sherbrooke, Québec J1E 0B5, Canada) and housed in the Animal Research Centre of Simon Fraser University ("SFU"). On arrival, rats were assigned to four groups of five male rats each and four groups of five female rats each, accommodated in cages (50 cm×40 cm×20 cm) lined with commercial corn cob bedding (Anderson's Bed o'cobs, The Andersons Inc., Maumee, Ohio 43537, USA), provided with Nalgene toys (Jaimesons Pet Food Distributers, Richmond, BC V4G 1C9, Canada), and provisioned with commercial rodent food (LabDiet® Certified Rodent Diet, LabDiet, St Louis, Mo. 64144, USA) as well as water ad libitum.

Design of Laboratory Experiments for Testing Behavioral Responses of Rats

A laboratory experimental apparatus was constructed to test the behavioral responses of rats to the compositions described herein. The experimental design is depicted in FIG. 1 and includes a circular galvanized steel arena (200 cm×60 cm) illuminated from above by a 7.5-W red bulb (Halco Lighting Technologies, Norcross, Ga. 30071, USA) to facilitate observations of the position of the rat within the steel arena. Two metal trap boxes (3*a*, 3*b*) (each 25 cm×20 cm×12 cm; T. Eaton & Co. Inc., Twinsburg, Ohio 44087, USA) were placed in opposite quadrants of the arena (1) 10 cm from the wall to serve as harborage. Each box (3*a*, 3*b*) was fitted with a Petri dish (3 cm) containing a Whatman #1 filter paper disk (25 mm diam; Sigma-Aldrich Canada Co. Oakville, On L6H 6J8) treated with a randomly assigned treatment or control stimulus. Individual rats were released from a gated mesh and sheet metal box (2) (25 cm×15 cm×15 cm) positioned equidistant to each of the two metal trap boxes (3*a*, 3*b*).

For each experimental replicate, a single rat was removed from its "home" cage, and placed into the gated mesh- and sheet-metal container (2). After a 10-min acclimation period, the gate was raised, allowing the rat to leave the box (2) on its own accord and to explore the arena (1) and the trap boxes (3*a*, 3*b*).

A rat was classed a responder if it entered a trap box (3*a*, 3*b*). For each responding rat, two criteria were recorded and analyzed: 1) the trap box (3*a*, 3*b*) it entered first ("first entry"), and 2) the time it spent in the arena quadrants associated with a trap box ("time spent"). The latter data were obtained by recording the rat's position in any one of the four arena quadrants at each of 30 1-min intervals. Following each replicate, the arena and trap boxes were cleaned with a Percept™ disinfectant detergent (Virox Technologies Inc. Mississaugua ON L5N 5M4, Canada) and were wiped with a pet urine odor remover (Nature's Miracle®, Spectrum Brands Inc., Blacksburg, Va. 24060-6671, USA).

First-choice data and the time spent in a trap box quadrant were analyzed using $\chi^2$ test with Yates' correction for continuity ($\alpha$=0.05) and the Student's t-test ($\alpha$=0.05), respectively.

Experiments 1 and 2

Responses of Male and Female Rats to Synthetic Androstenone in Laboratory Experiments In Experiments 1 and 2, the laboratory experimental design of FIG. 1 was used to evaluate the responses of male and female rats to synthetic androstenone. For Experiments 1 and 2, the treatment stimulus consisted of filter paper sprayed with 2 ml of an aqueous microemulsion containing 4 μg of synthetic androstenone and a control stimulus which consisted of untreated filter paper. The treatment stimulus and control stimulus were placed in the trap boxes (3*a*, 3*b*). Experiment 1 tested the response of male rats and Experiment 2 tested the response of female rats.

Figure 2:
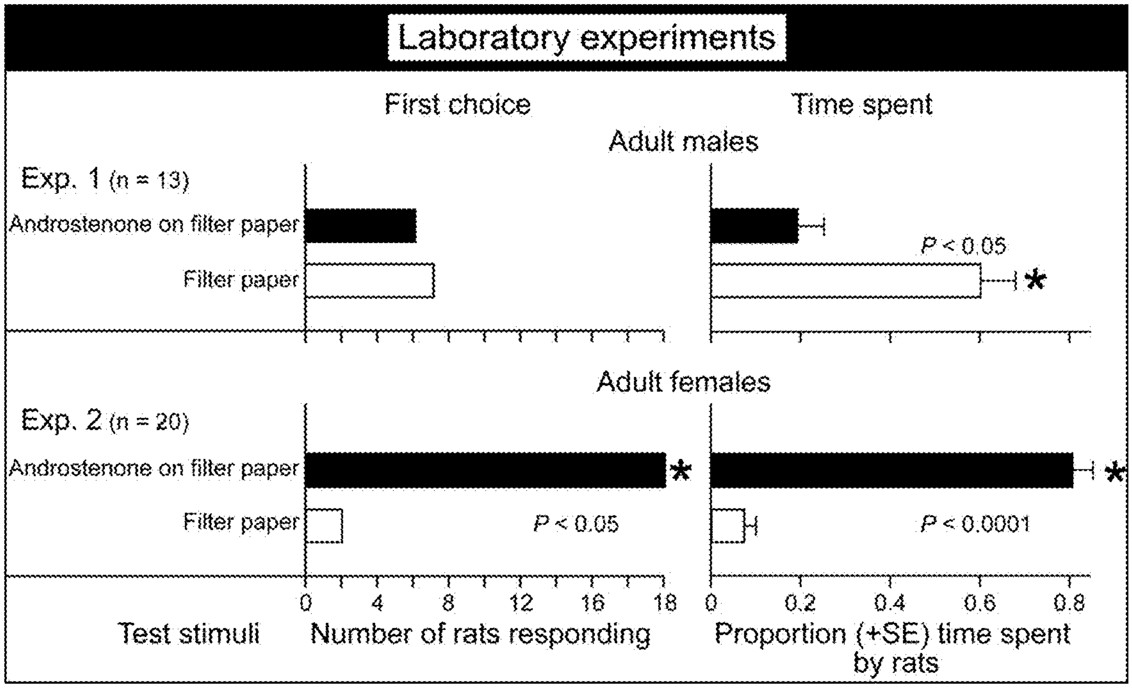
FIG. 2 depicts graphs illustrating the effect of androstenone on behavioral responses of adult (>12-week-old) brown rats, *Rattus norvegicus.*

In Experiment 1, androstenone had no observed attractive effect on male rats. Male rats chose to first enter the trap box (3*a*, 3*b*) baited with the treatment stimulus (androstenone) as often as the corresponding control trap-box (3*a*, 3*b*) baited with the control stimulus ($\chi^2$=0, P=1.0) as depicted in FIG. 2. As further depicted in FIG. 2, male rats also spent significantly less time in quadrants associated with the control stimulus (androstenone) than in opposite control quadrants (df=13, t crit=2.17, t=3.00, P=0.005).

In Experiment 2, androstenone was observed to have a very attractive effect on female rats. Female rats chose to first enter the trap box (3*a*, 3*b*) baited with the treatment stimulus (androstenone) significantly more often than the corresponding control trap box (3*a*, 3*b*) baited with the control stimulus ($\chi^2$=11.25, P<0.05) as depicted in FIG. 2. Similarly, female rats also spent significantly more time in quadrants associated with the treatment stimulus (androstenone) than in opposite control quadrants (df=19, t crit=2.09, t=9.86, P<0.001).

These results unexpectedly suggest that androstenone serves as an attractive compound for female rats.

Experiments 3 and 4

Responses of Male Rats to Synthetic Progesterone and Estrogen in Laboratory Experiments In Experiments 3 and 4, the laboratory experimental design of FIG. 1 was used to evaluate the responses of male and female rats to synthetic progesterone and estrogen. For Experiments 3 and 4, the treatment stimulus consisted of filter paper impregnated with a 4-μg blend of the synthetic hormones progesterone and estrogen formulated in 50 μl of ether at a ratio of either 100:1 (Experiment 3) or 1000:1 (Experiment 4). The control stimulus in each of Experiments 3 and 4 consisted of filter paper impregnated with 50 μl of ether.

Figure 3:
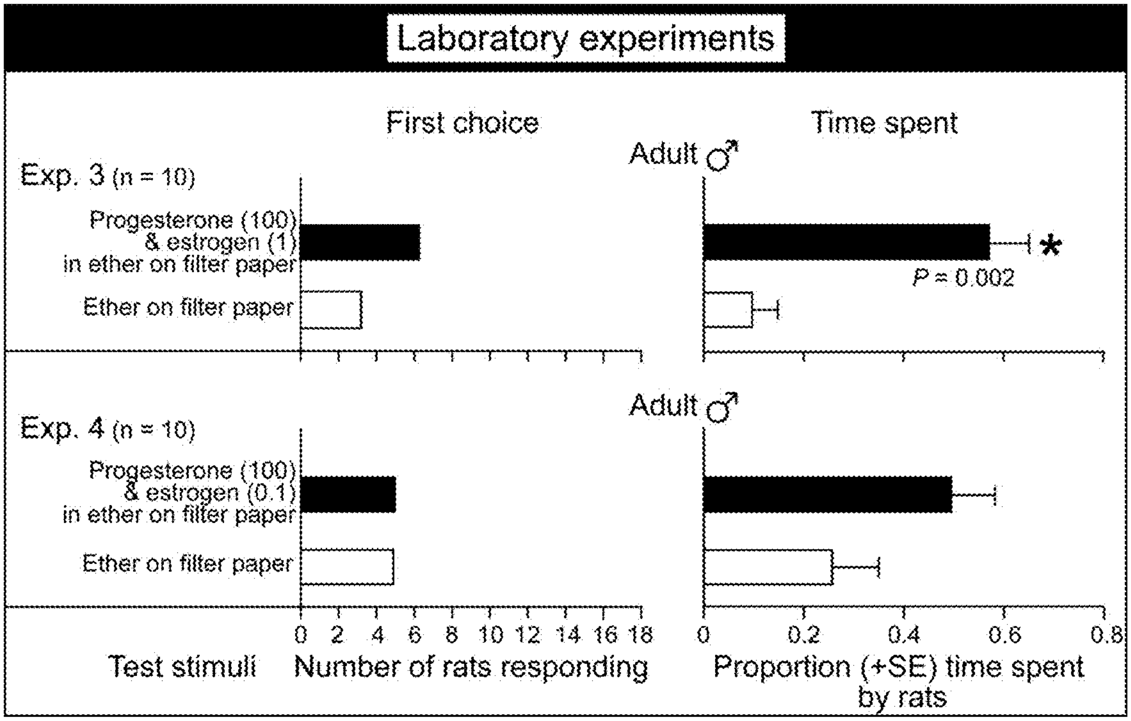
FIG. 3 depicts graphs illustrating the effect of a blend of the synthetic hormones progesterone and estrogen on behavioral responses of adult (>12-week-old) brown rats, *Rattus norvegicus.*

In Experiment 3, the hormone blend of progesterone and estrogen (100:1 ratio) was observed to have a positive effect on the responses of male rats. As depicted in FIG. 3, male rats spent significantly more time in quadrants associated with the treatment stimulus than in opposite control quadrants associated with the control stimulus (df=9, t crit=2.26, t=4.08, P=0.003). However, male rats also chose to first enter the trap box (3*a*, 3*b*) baited with the treatment stimulus (hormone blend) as often as the corresponding control trap box (3*a*, 3*b*) baited with the control stimulus ($\chi^2$=0.5, P=0.44).

In Experiment 4, the hormone blend of progesterone and estrogen at a ratio of 100:0.1 was observed not to have a significant effect on responses of male rats (first choice: $\chi^2$=0.75, P=0.1; time spent: df=9, t crit=2.26, t=1.3, P=0.22) as depicted in FIG. 3.

These results unexpectedly suggest that progesterone and estrogen can serve as sex attractant components for male rats.

Source and Maintenance of the Mouse Colony

House mice, *Mus musculus* (strain: CD-1; UACC protocol number 1159B-15), were obtained from Charles River Laboratories Ltd (Sherbrooke, Quebec J1E OBS, Canada) and housed in the Animal Research Centre of Simon Fraser University (SFU). On arrival, mice were assigned to four groups of five male mice each and four groups of five female mice each, accommodated in cages (50 cm×40 cm×20 cm) lined with commercial corn cob bedding (Anderson's Bed o'cobs, The Andersons Inc. Maumee, Ohio 43537, USA), provided with Nalgene toys and running wheels (Jaimesons Pet Food Distributers, Richmond, BC V4G 1C9, Canada), and provisioned with commercial rodent food (LabDiet® Certified Rodent Diet, LabDiet, St Louis, Mo. 64144, USA) as well as water ad libitum.

Design of Laboratory Experiments for Testing Behavioral Responses of Mice

Figure 4:
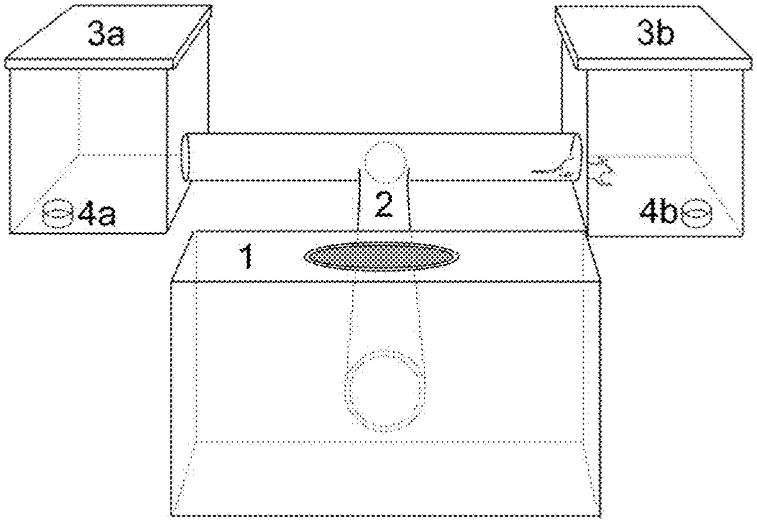
FIG. 4 depicts an experimental T-tube design used to evaluate behavioral responses of mice.

A laboratory experimental apparatus was constructed to test the behavioral responses of mice to the compositions described herein. The experimental design is depicted in FIG. 4 and includes three clear Plexiglas chambers: release chamber (1: 40 cm×20 cm×30 cm for placement of a mouse at the onset of a bioassay), and response chambers (3*a* and 3*b*: each 60 cm×30 cm×40 cm) interconnected by a Pyrex glass T-tube (2; stem: 65 cm long, side arms: 45 cm long, all 10 cm in diameter). Each response chamber housed a test stimulus in a Petri dish (4*a*, 4*b*; 3 cm diam.). For each replicate, a single mouse was deprived of food, but not water, for 4-6 h before being placed into chamber 1, which was illuminated by dim red light to facilitate observations of the mouse's position. The mouse was allowed to enter the stem of the T-tube (2) on its own accord in response to test stimuli, which were randomly assigned to response chamber 3*a* or 3*b*.

Both response chambers were fitted with a Petri dish (4*a*, 4*b*) containing a Whatman #1 filter paper disk (25 mm diam.) treated with a randomly assigned treatment stimulus or control stimulus. For each bioassay, a single mouse was tested and the following data were recorded: (1) the treatment or control chamber the mouse entered first with all four paws ("first-choice data"); and (2) the position of the mouse at each of 30 30-sec intervals after its first entry into the T-tube. Position data were then used to calculate the proportion of time a mouse spent in the treatment or control chamber ("time-spent data").

Following each replicate, the chambers and T-tube were cleaned with a Percept® disinfectant detergent (Virox Technologies Inc. Mississaugua ON L5N 5M4, Canada) and wiped with 70% ethanol.

First-choice data and the time spent in a trap box quadrant were analyzed using a $\chi^2$ test with Yates' correction for continuity ($\alpha$=0.05) and the Student's t-test ($\alpha$=0.05), respectively.

Experiment 5

Responses of Female Mice to Synthetic Androstenone in Laboratory Experiments

In Experiment 5, the laboratory experimental design of FIG. 4 was used to evaluate the responses of female mice to synthetic androstenone. For Experiment 5, the treatment stimulus consisted of filter paper treated with 4 μg of synthetic androstenone (see Experiments 1 and 2), and the control stimulus consisted of filter paper treated with the 50 μl of ether without androstenone.

Figure 5:
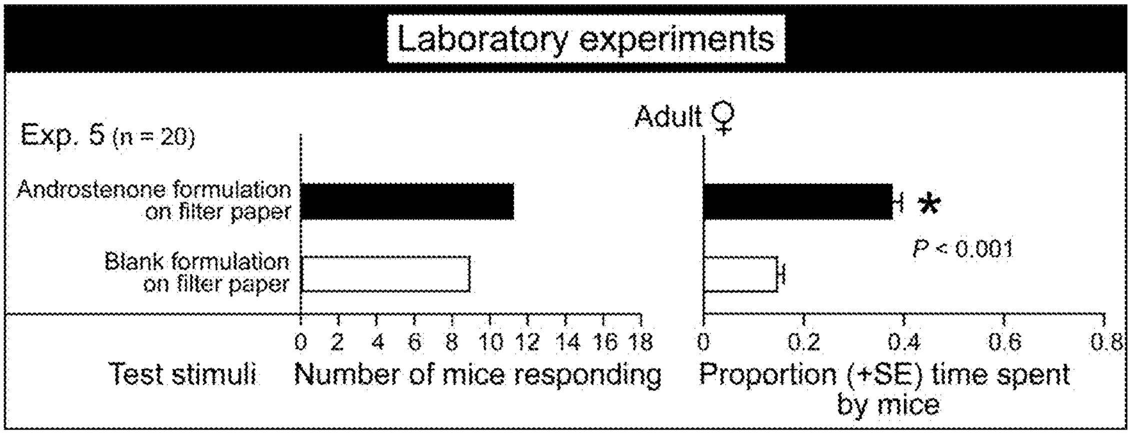
FIG. 5 depicts graphs illustrating the effect of stimuli on behavioral responses of adult (>12-week-old) female house mice, *Mus musculus.*

In Experiment 5, androstenone was observed to have a positive effect on female mice as depicted in FIG. 5. Female mice spent significantly more time in the response chamber (3*a*, 3*b*) associated with synthetic androstenone than in the response chamber (3*a*, 3*b*) associated with the control stimulus (df=19, t crit=2.09, t=8.43, P<0.001). However, female mice also chose to first enter the response chamber (3*a*, 3*b*) baited with synthetic androstenone as often as the response chamber (3*a*, 3*b*) associated with the control stimulus ($\chi^2$=0.05, P=0.82).

Similarly to rats, these results unexpectedly suggest that androstenone can serve as a sex attractant for female mice.

Experiment 6

Response of Male Mice to Synthetic Progesterone and Estrogen in Laboratory Experiments In Experiment 6, the laboratory experimental design of FIG. 4 was used to evaluate the responses of male mice to blends of synthetic progesterone and estrogen. For Experiment 6, the treatment stimulus consisted of filter paper treated with a 4-μg blend of the synthetic hormones progesterone and estrogen formulated in 50 μl of ether at a ratio of 100:1 and a control stimulus which consisted of filter paper treated with 50 μl of ether.

Figure 6:
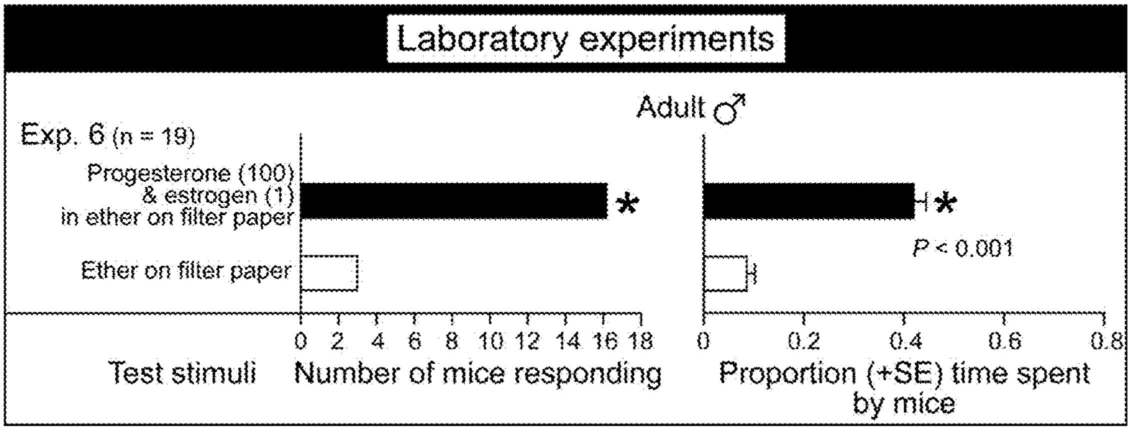
FIG. 6 depicts graphs illustrating the effect of stimuli on behavioral responses of adult (>12-week-old) male house mice, *Mus musculus.*

In Experiment 6, the hormone blend of progesterone and estrogen was observed to have a very positive effect on the responses of male mice. As depicted in FIG. 6, male mice chose to first enter the response chamber (3*a*, 3*b*) baited with the hormone blend significantly more often than the corresponding response chamber (3*a*, 3*b*) associated with the control stimulus ($\chi^2$=7.58, P=0.006). Male mice also spent significantly more time in the response chamber (3*a*, 3*b*) associated with the hormone blend than in the response chamber (3*a*, 3*b*) associated with the control stimulus (df=18, t crit=2.10, t=9.58, P<0.001).

As for rats, these results unexpectedly suggest that progesterone and estrogen can serve as sex attractant pheromone components for male mice.

Experiments 7 and 8

Figure 7:
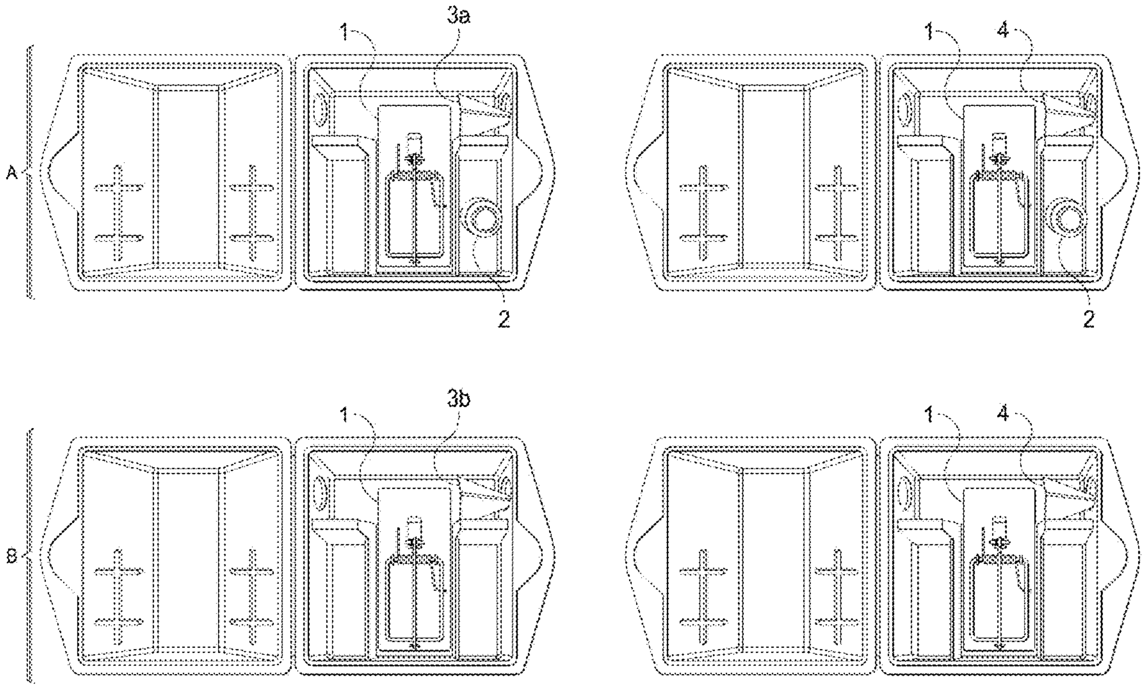
FIG. 7 depicts an experimental design of paired trap boxes used to evaluate behavioral responses of rodents.

Responses of Wild Mice to Synthetic Androstenone or to Synthetic Progesterone and Estrogen in Field Experiments Two field experiments were run in parallel from Feb. 4, 2016 to Apr. 14, 2016 in Vancouver B.C. to evaluate the effect of synthetic androstenone (Experiment 7) and of synthetic progesterone and estrogen (Experiment 8) on trap captures of wild mice. Experimental replicates were set up as depicted in FIG. 7 along the interior walls and bird feeder areas of a plant and bird conservatory maintained under tropical conditions. Each replicate consisted of a pair of trap boxes (PROTECTA® Mouse, Bell Laboratories Inc., Madison, Wis. 53704, USA), with 50-cm spacing between boxes in each pair, and at least 2 m between pairs.

In Experiments 7 and 8, each box in each pair contained a snap trap (1) (FIG. 7) that was baited with a food lure (Musso et al. 2014). In Experiment 7, the trap box was also baited with the synthetic two-component sex pheromone of male mice (3,4-dehydro-exo-brevicomin and 2-sec-butyl-4,5-dihydrothiazole). The compounds were formulated in 10 g of mineral oil and dispensed from a custom-made scintillation vial (2) (FIG. 7). Each box in each pair also contained a piece of Whatman #1 filter paper that by random assignment was treated with 4 μg of synthetic androstenone dissolved in 50 μl ether (3*a*) or 50 μl ether (control; 4).

In Experiment 8, each box in each pair also housed a piece of filter paper that by random assignment was treated with either 4 μg of a 100:1 blend of progesterone and estrogen formulated in 50 μl ether (3*b*) or 50 μl ether (4).

All boxes and snap traps in both experiments were checked every 48 h to 72 h, and test stimuli (food lure, male-specific pheromone blend in mineral oil, filter paper with or without hormones) were replaced at each visit. Whenever mice had been captured, their age (juvenile or adult) and sex were recorded, and new trap boxes and snap traps were deployed, thus ensuring that the odor of captured mice did not affect future captures.

Mouse captures in treatment and control traps were compared against an expected 50:50 distribution using $\chi^2$ tests with Yates' correction for continuity ($\alpha$=0.05). Replicates with captures in both trap boxes of a pair are not included in the graphical illustration and statistical analyses of data.

Figure 8:
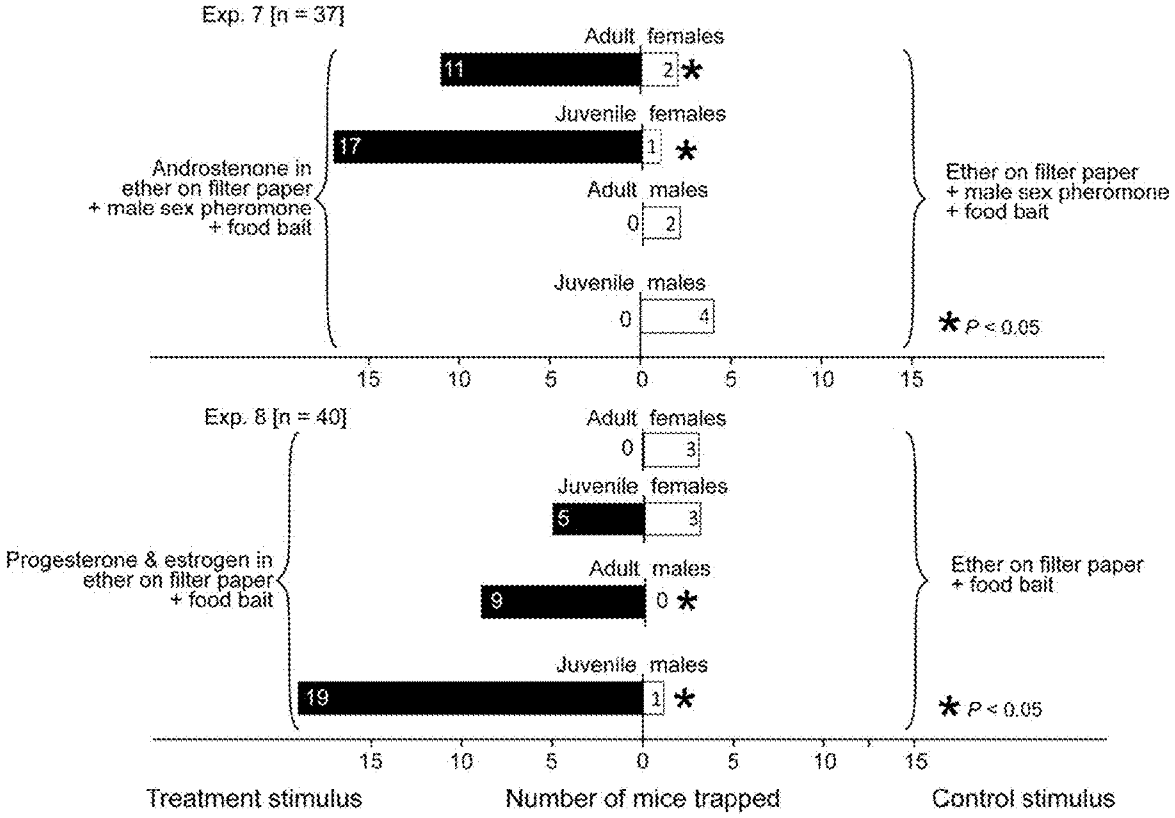
FIG. 8 depicts graphs illustrating the effect of androstenone, or of progesterone and estrogen, on trap captures of wild house mice, *Mus musculus*, in field experiments.

In Experiment 7, trap boxes baited with synthetic androstenone captured significantly more juvenile and adult female mice than corresponding control boxes (Adults: $\chi^2$=4.92, P=0.0265; juveniles: $\chi^2$=12.5, P<0.000407) as depicted in FIG. 8. In Experiment 8, trap boxes baited with synthetic progesterone and estrogen also captured significantly more juvenile and adult male mice than corresponding control boxes (Adults: $\chi^2$=7.11, P<0.00077; juveniles $\chi^2$=14.45, P=0.00014) as depicted in FIG. 8.

Surprisingly, the results of Experiment 7 confirm in a definitive field experiment that androstenone serves as a sex attractant for female mice, and the results of Experiment 8 confirm that progesterone and estrogen serve as sex attractant pheromones for male mice. This discovery is the first instance in which hormones of vertebrates have been shown to serve outside of the body as sex attractant pheromone components for rodents.

Experiments 9 to 11

Response of Male Mice in Laboratory Experiments to Low Doses of Synthetic Progesterone and Estrogen Alone or in Combination In Experiments 9 to 11, the laboratory experimental design of FIG. 4 was used to evaluate the responses of male mice to synthetic progesterone and estrogen. For the Experiments, the treatment stimulus consisted of filter paper treated with a blend of the synthetic progesterone (50 ng) and estrogen (25 ng) (hereinafter "synthetic hormone blend") (Experiment 9), progesterone alone (75 ng) (Experiment 10) or estrogen alone (75 ng) (Experiment 11) formulated in 50 µl ether. The control stimulus consisted of filter paper treated with 50 µl of ether for each of Experiments 9 to 11.

Figure 9:
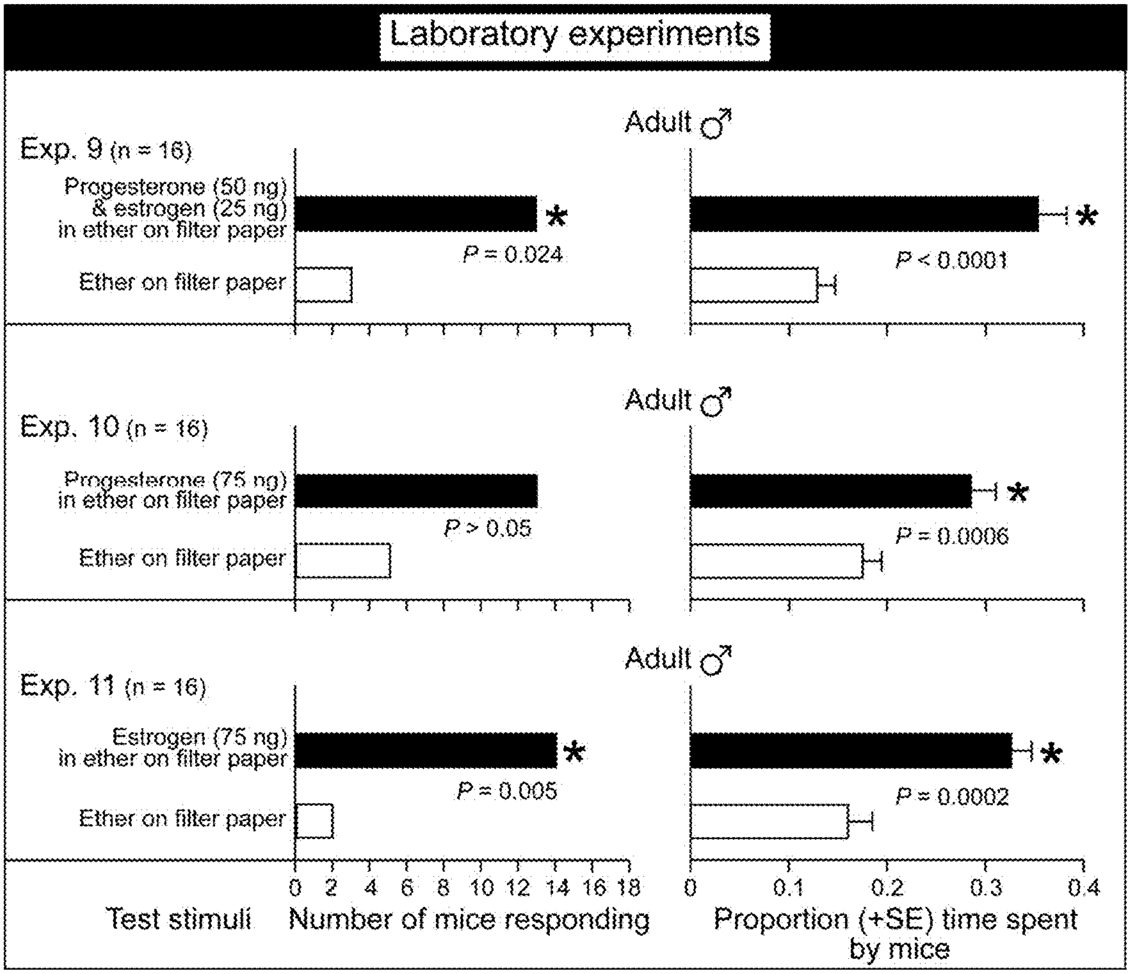
FIG. 9 depicts graphs illustrating the effect of a blend of progesterone and estrogen, progesterone alone, or estrogen alone on behavioral responses of adult (>12-week-old) male house mice, *Mus musculus.*

In Experiment 9, the blend of progesterone and estrogen was observed to have a positive effect on the responses of male mice. As depicted in FIG. 9, male mice chose to first enter the chamber baited with the treatment stimulus (synthetic hormone blend) significantly more often than the corresponding control chamber containing the control stimulus ($\chi^2$=6.25, P=0.024). Male mice also spent significantly more time in the chamber associated with the treatment stimulus (synthetic hormone blend) than in the opposite control chamber (df=15, t crit=2.13, t=5.62, P<0.001). Responses to progesterone alone (Experiment 10) were less pronounced as depicted in FIG. 9. In Experiment 10, male mice did not significantly choose to first enter the progesterone-treated chamber ($\chi$=2.25, P>0.05), but did spend significantly more time in the progesterone-treated chamber than in the chamber containing the control stimulus (df=15, t crit=2.13, t=4.29, P<0.001). Experiment 11 showed that male mice were more responsive to estrogen than to progesterone. In Experiment 11, male mice chose to first enter the chamber baited with the treatment stimulus (estrogen) significantly more often than the corresponding chamber containing the control stimulus ($\chi^2$=9.00, P=0.005) as depicted in FIG. 9. Male mice also spent significantly more time in the chamber associated with the treatment stimulus (estrogen) than in the opposite chamber containing the control stimulus (df=15, t crit=2.13, t=4.67, P<0.001).

These results unexpectedly indicate that even at very low doses progesterone and estrogen act as sex attractant pheromone components for mice. The results also suggest that male mice are more attracted to estrogen than to progesterone.

Experiments 12 and 13

Responses of Female Mice to Low Doses of Testosterone or Androstenone in Laboratory Experiments Experiment 12 used the laboratory experimental apparatus of FIG. 4 to test choices of female mice between filter paper treated with 75 ng of synthetic testosterone (the treatment stimulus) formulated in 50 µl of ether and control filter paper treated with 50 µl of ether. Experiment 13 was identical to Experiment 12 except that the treatment stimulus consisted of filter paper treated with 75 ng of synthetic androstenone.

Figure 10:
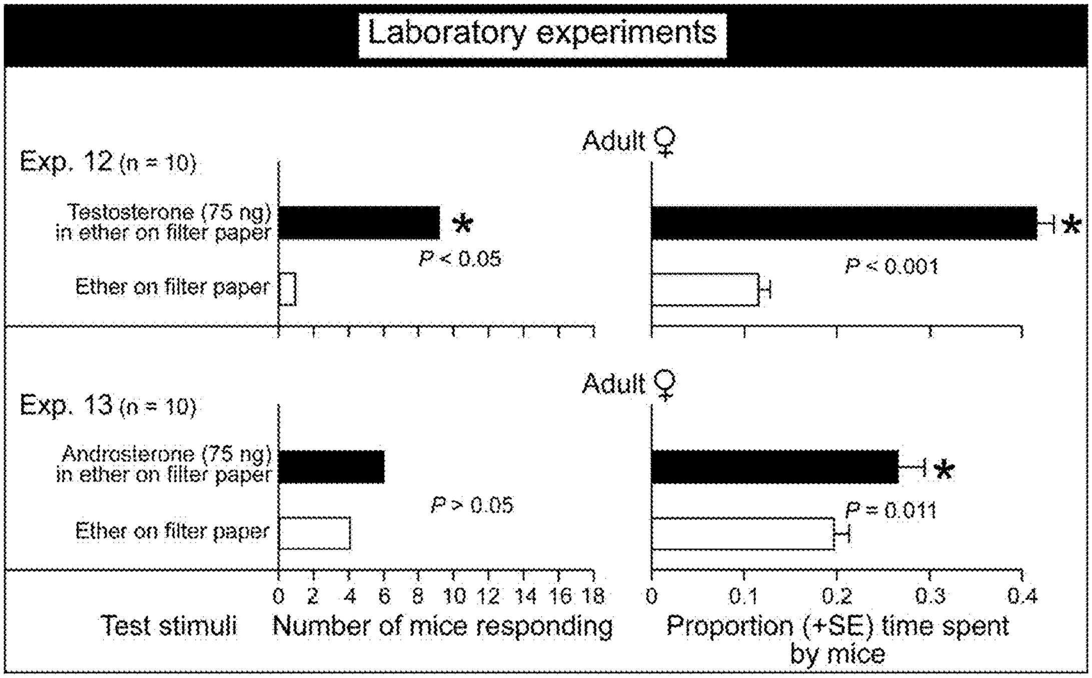
FIG. 10 depicts graphs illustrating the effect of testosterone or androstenone on the behavioral responses of adult (>12-week-old) female house mice, *Mus musculus.*

In Experiment 12, testosterone was observed to have a very positive effect on female mice. Female mice chose to first enter the chamber baited with the treatment stimulus (testosterone) significantly more often than the corresponding chamber containing the control stimulus (ether) ($\chi^2$=6.4, P<0.05), and also spent significantly more time in the chamber baited with the treatment stimulus (testosterone) than in the chamber containing the control stimulus (ether) (df=9, t crit=2.26, t=13.37, P<0.001) as depicted in FIG. 10. In Experiment 13, the responses by female mice to androstenone were much weaker than their responses to testosterone in Experiment 12. As depicted in FIG. 10, female mice chose to first enter the chamber baited with the treatment stimulus (androstenone) as often as the corresponding chamber containing the control stimulus (ether) ($\chi^2$=0.4, P>0.05). Although female mice spent slightly more time in the chamber baited with the treatment stimulus (androstenone) than in the corresponding chamber containing the control stimulus (ether) (df=9, t crit=2.26, t=3.16, P<0.05) the difference in time spent was far smaller than the over threefold preference shown in Experiment 12 for the testosterone-treated chamber.

These results strongly suggest that both testosterone and androstenone can serve as a sex attractant for female mice. They further indicate that testosterone is a more potent attractant than androstenone.

Experiment 14

Responses of Female Rats to Low Doses of Testosterone in Laboratory Experiments Experiment 14 used the laboratory experimental apparatus of FIG. 1 to test choices of female rats between a treatment stimulus consisting of filter paper treated with 150 ng of synthetic testosterone formulated in 50 µl of ether and a control stimulus consisting of filter paper treated with 50 µl of ether.

Figure 11:
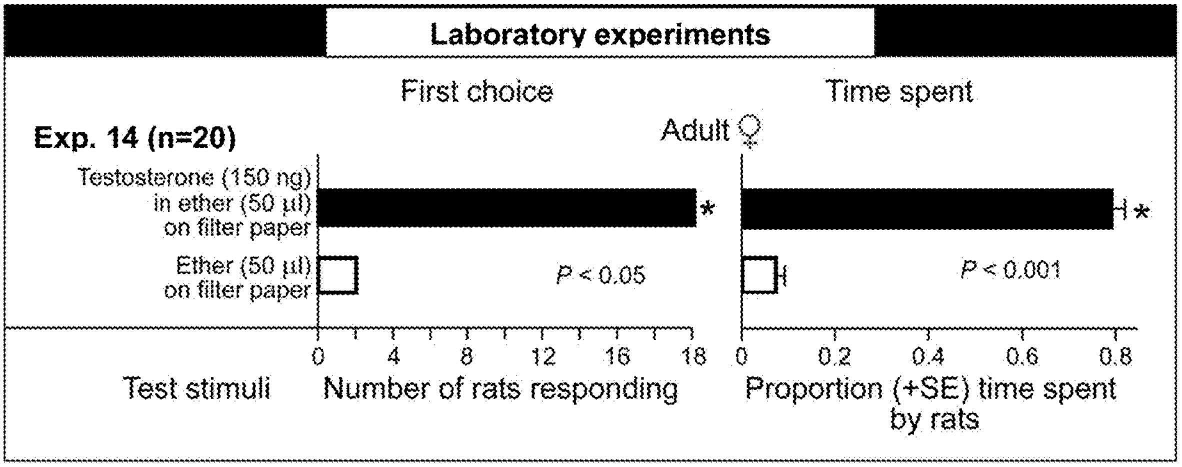
FIG. 11 depicts graphs illustrating the effect of testosterone on behavioral responses of female brown rats, *Rattus norvegicus.*

Testosterone was observed to have a very positive attractant effect on female rats. As depicted in FIG. 11, female rats chose to first enter the trap box baited with the treatment stimulus (testosterone) significantly more often than the trap box containing the control stimulus (ether) ($\chi^2$=11.25, P=0.0008). Female rats also spent significantly more time in the arena quadrant (FIG. 1) associated with the trap box baited with the treatment stimulus (testosterone) than in the opposite arena quadrant associated with the trap box containing the control stimulus (ether) (df=19, t crit=2.09, t=9.86, P<0.0001)

These results suggest that testosterone can serve as a sex attractant pheromone component for female rats.

Experiments 15 to 18

Responses of Rats and Mice to Synthetic Androstenone and Testosterone in Field Experiments Four field experiments were run in Vancouver B.C. to evaluate the effect of synthetic androstenone and synthetic testosterone on captures of female wild mice and rats in combination with species-specific male sex pheromone blend. Experimental replicates were set up along the interior and exterior walls of buildings as depicted in FIG. 7. Experiment 15 evaluated captures of wild mice in trap boxes baited with high-levels of androstenone; Experiment 16 evaluated captures of wild rats in traps baited with high-levels of androstenone; Experiment 17 evaluated captures of wild mice in traps baited with low-levels of testosterone; and Experiment 18 evaluated captures of wild mice in traps baited with low-levels of androstenone. Experiment 15 was run from Feb. 4, 2016 to Apr. 14, 2016. Experiment 16 was run from Feb. 26, 2016 to Sep. 19, 2016. Experiments 17 and 18 were run in parallel from Jun. 2, 2016 to Sep. 8, 2016.

Each replicate of Experiments 15 to 18 consisted of a pair of trap boxes (Mice: PROTECTA® Mouse, Bell Laboratories Inc., Madison, Wis. 53704, USA; Rats: PROTECTA® Sidekick™; Bell Laboratories Inc., Madison, Wis. 53704), with 50-cm spacing between boxes in each pair, and at least 2 m between pairs. Each trap box contained an armed snap trap (1, Mice: Victor® Easy Set® Mouse Trap; Rats: Victor® Easy Set® Rat Trap; Woodstream Corp, Lititz, Pa. 17543, USA) baited with a cereal-based food bait and a scintillation vial (2) containing synthetic sex pheromone blends. Each box in each pair also contained a treatment stimulus that consisted of a piece of Whatman #1 filter paper (3*a*) that by random assignment was treated with: 4 µg of synthetic androstenone dissolved in 50 µl ether (Experiments 15 and 16); 750 µg of synthetic testosterone dissolved in 50 µl ether (Experiment 17); or 750 µg of synthetic androstenone dissolved in 50 µl ether (Experiment 18). The corresponding box in each pair contained a control stimulus which consisted of a piece of Whatman #1 filter paper (3*b*) treated with 50 µl ether.

The synthetic sex pheromone blends included in the scintillation vessels for Experiments 15, 17, and 18 (mice) included 3,4-dehydro-exo-brevicomin and 2-sec-butyl-4,5-dihydrothiazole; 2 mg total (formulated in mineral oil at a 1:1 ratio). The synthetic sex pheromone blends included in the scintillation vessels for Experiment 16 (rats) included 2-heptanone, 4-heptanone, 3-ethyl-2-heptanone, 2-octanone, 2-nonanone, 4-nonanone; 1 mg total (respectively formulated in mineral oil at a 100:100:10:1:1:10 ratio as found in headspace volatiles of urine odor).

All boxes and snap traps in both experiments were checked every week, and test stimuli (food lure, male-specific pheromone blend in mineral oil, filter paper with or without hormones) were replaced at each visit. Whenever mice or rats had been captured, their age (juvenile or adult) and sex were recorded, and new trap boxes and snap traps were deployed, thus ensuring that the odor of captured mice or rats did not affect future captures.

Figure 12:
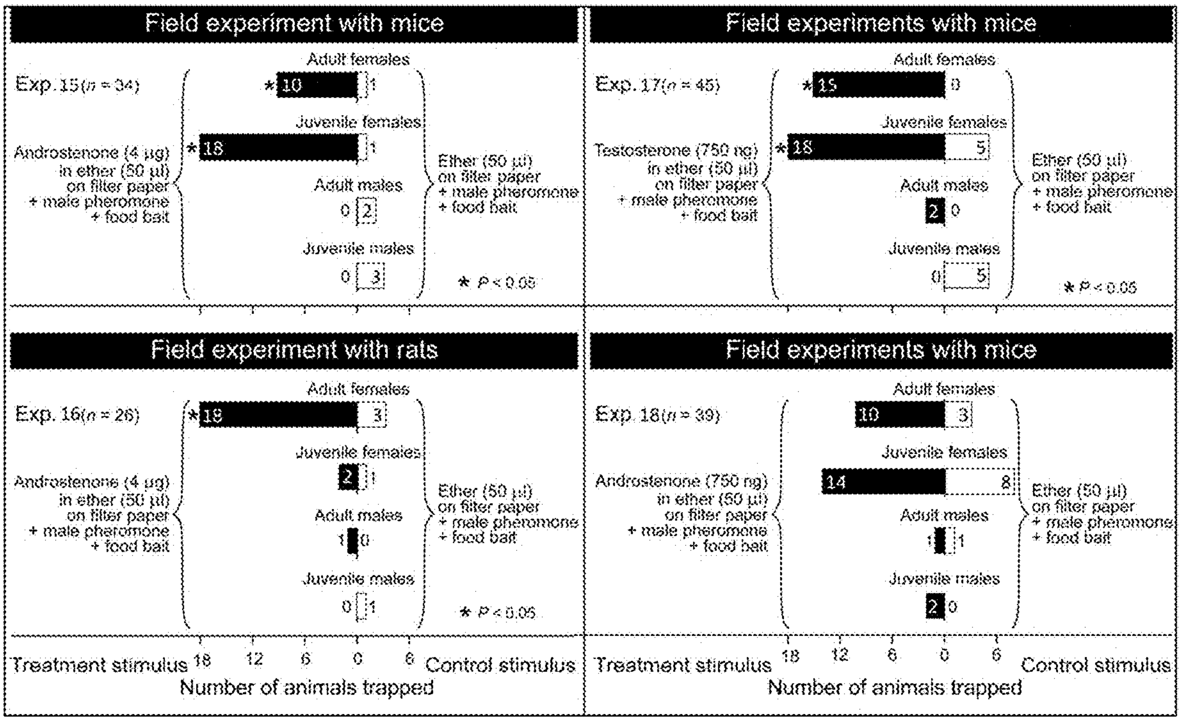
FIG. 12 depicts graphs illustrating the effect of androstenone and testosterone on behavioral responses of mice and rats in field experiments.

In Experiment 15, trap boxes baited with synthetic androstenone captured significantly more juvenile and adult female mice than corresponding control boxes (adults: $\lambda^2$=7.36, P<0.05; juveniles: $\chi^2$=15.21, P<0.001) as depicted in FIG. 12. In Experiment 16, trap boxes baited with synthetic androstenone captured significantly more adult female rats than corresponding control boxes ($\chi^2$=10.71, P<0.005). In Experiment 17, testosterone-baited traps captured significantly more adult and juvenile female mice than control traps (adults: $\chi^2$=15.00, P<0.001; juveniles: $\chi^2$=7.34, P<0.01) as depicted in FIG. 12. In parallel Experiment 18, however, captures of female mice in androstenone-baited traps did not differ statistically from those in control traps, as depicted in FIG. 12. In Experiments 15, 16, and 18, synthetic androstenone as a trap bait had no significant effect on captures of juvenile and adult male mice, juvenile and adult male rats, and juvenile female rats. In Experiment 17, synthetic testosterone as a trap bait had no significant effect on captures of both adult and juvenile mice.

Surprisingly, the results of field Experiments 15 to 18 confirm that androstenone serves as a sex attractant for adult and juvenile female mice and adult female rats. The results also confirm that testosterone serves as a sex attractant pheromone component for adult and juvenile female mice.

Experiments 19 and 20

Responses of Rats and Mice to Synthetic Blends of Progesterone and Estradiol (Estrogen) in Field Experiments Experiments 19 and 20 evaluated the effect of synthetic blends of progesterone and estradiol (estrogen) on captures of wild mice (Experiment 19) and wild rats (Experiment 20) in the field. The experimental setup of Experiments 19 and 20 was identical to that of Experiments 15 to 18, but different stimuli were tested. Experiment 19 was run from Feb. 4, 2016 to Apr. 14, 2016. Experiment 20 was run from Feb. 26, 2016 to Sep. 19, 2016.

In Experiment 19, the treatment stimulus (3*a*) was, by random assignment, a piece of Whatman #1 filter paper treated with 4 µg of a 1000:1 blend of progesterone and estradiol (estrogen). The control stimulus consisted of a piece of Whatman #1 filter paper (4) treated with 50 µl ether.

In Experiment 20, the treatment stimulus (3*a*) was, by random assignment, a piece of Whatman #1 filter paper treated with 4 µg of a 100:1 blend of progesterone and estradiol (estrogen). The control stimulus was a piece of Whatman #1 filter paper (4) treated with 50 µl ether. In Experiment 20, a volatile blend of female sex pheromone components was further included in a scintillation vial (2) and consisted of 2-methyl-butyric acid (4), 3-methyl-butyric acid, heptanal, hexanoic acid, 2-phenylacetaldehyde, nonanal and decanal 1 mg total (respectively formulated in mineral oil at a 4:2:6:1:4:2 ratio as found in headspace volatiles of urine odor).

Figure 13:
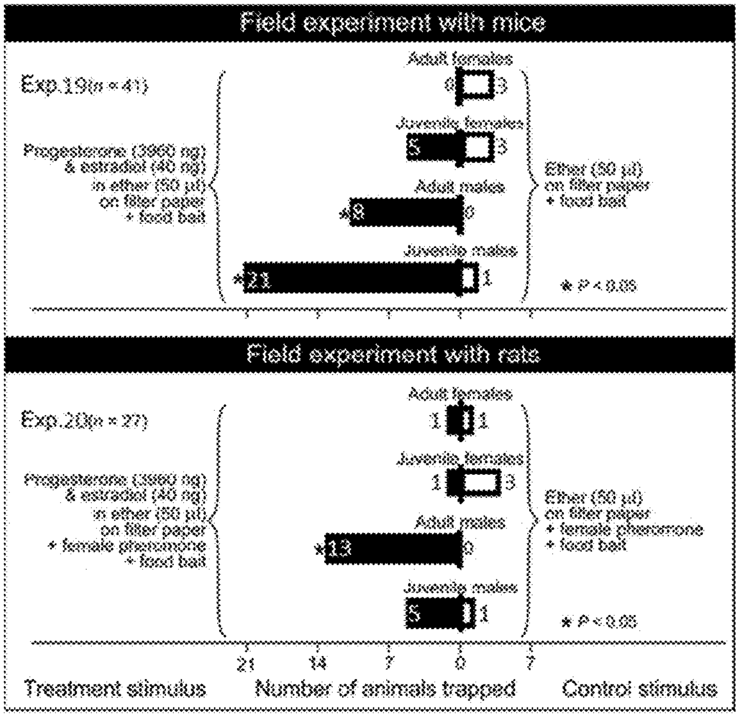
FIG. 13 depicts graphs illustrating the effect of progesterone and estradiol (estrogen) on behavioral responses of mice and rats in field experiments.

As depicted in FIG. 13, traps in Experiments 19 and 20 baited with a blend of progesterone and estradiol (estrogen) captured significantly more adult and juvenile male mice (adults: $\chi^2$=8.0, P<0.01; juveniles: $\chi^2$=18.18, P<0.001) and significantly more adult male rats ($\chi^2$=13.0, P<0.001) than traps containing a control stimulus.

The results of field Experiment 19 and 20 confirm that progesterone and estradiol (estrogen) function as sex attractant pheromone components for adult and juvenile male mice and adult male rats.

Experiments 21 to 23

Responses of Mice to Synthetic Progesterone and Estradiol (Estrogen) in Field Experiments Experiments 21 to 23 evaluated the effect of synthetic progesterone and estradiol (estrogen) when tested singly, or in a binary combination, on captures of wild mice. In each of Experiments 21 to 23, the treatment stimulus (3*a*) was, by random assignment, a piece of Whatman #1 filter paper treated with (i) 750 ng progesterone and estradiol (estrogen) in a 2:1 ratio (Experiment 21); (ii) 750 ng of progesterone (Experiment 22); or (iii) 750 ng of estradiol (estrogen) (Experiment 23). The control stimulus for each of Experiments 21 to 23 consisted of a piece of Whatman #1 filter paper (4) treated with 50 μl ether. Experiments 21 to 23 were run in parallel from Jun. 3, 2016 to Sep. 8, 2016.

Figure 14:
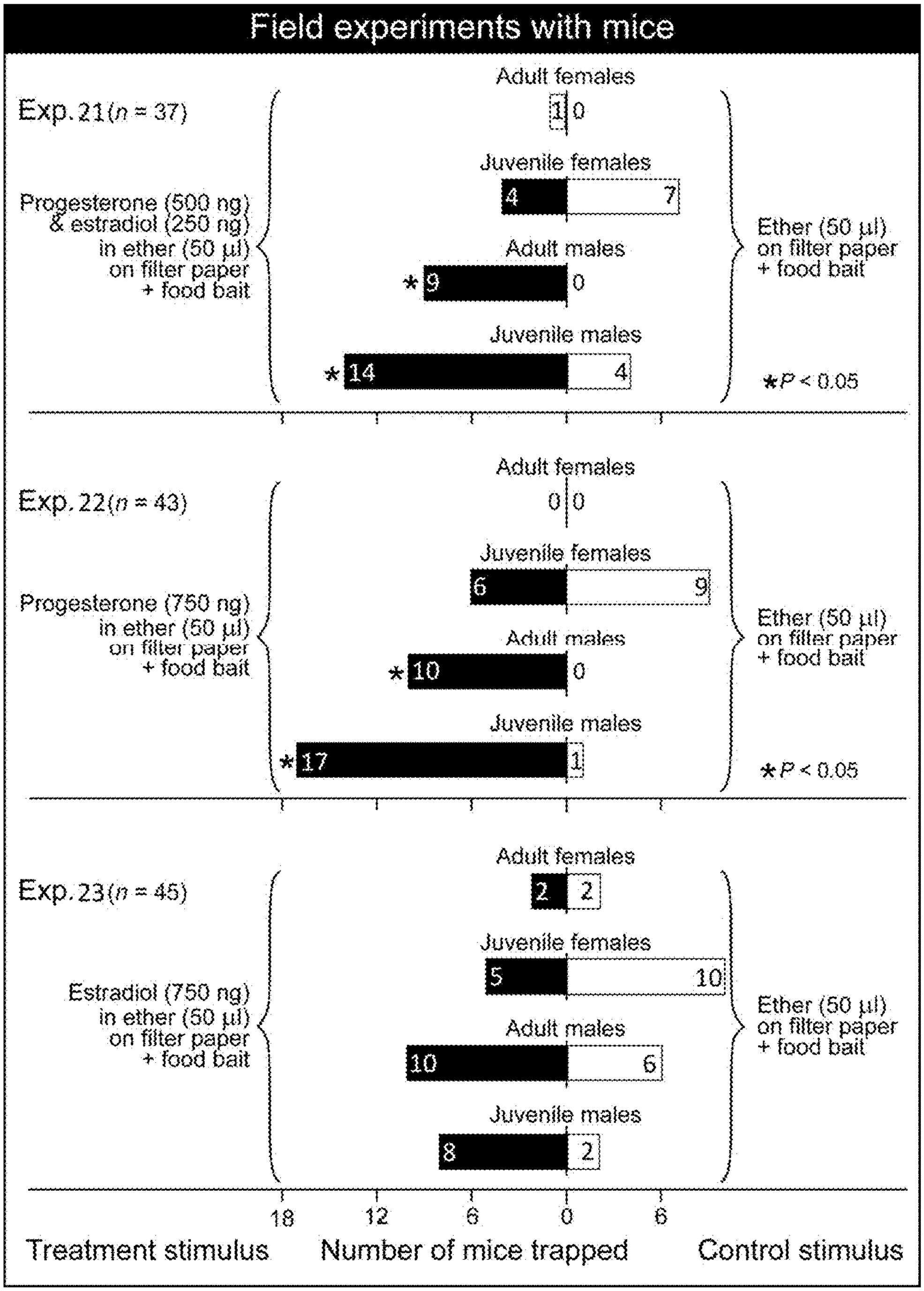
FIG. 14 depicts graphs illustrating the effect of progesterone and estradiol (estrogen) on behavioral responses of mice in field experiments.

Traps baited with the blend of progesterone and estradiol (estrogen), or with progesterone alone, captured significantly more adult and juvenile male mice than control traps (Experiment 21: adults: $\chi^2=9.00$, $P<0.01$; juveniles: $\chi^2=5.55$, $P<0.05$; Experiment 22: adults: $\chi^2=10.00$, $P<0.01$; juveniles: $\chi^2=14.22$, $P<0.001$) as depicted in FIG. 14. In contrast, estradiol-baited traps were as ineffective as control traps as indicated by Experiment 23. As previously indicated by data of Experiments 19 and 20, traps baited with female sex hormones did not capture significantly more female mice then control traps.

The results of field Experiments 21 to 23 confirm that progesterone alone, or in combination with estradiol (estrogen), functions as a sex attractant pheromone component for adult and juvenile male mice.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

Terminology used for describing particular embodiments is not intended to limit the scope of an exemplary embodiment. As used throughout this disclosure, the singular forms "a," "an," and "the" include the plural, unless the context clearly dictates otherwise. Thus, for example, a reference to a "rodent" encompasses one or more rodents. Furthermore, if in describing some embodiments or features permissive language (e.g., "may") is used, that does not suggest that embodiments or features described using other language (e.g., "is," or "are") are required. Unless defined otherwise, all terms have the same commonly understood meaning that one of ordinary skill in the art to which this disclosure belongs would expect them to have.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of ordinary skill in the art. Rather it is hereby intended the scope be defined by the claims appended various embodiments. The scope is, of course, not limited to the examples or embodiments set forth herein, but can be employed in any number of applications and equivalent articles by those of hereto.

What is claimed is:

1. A method for attracting a rodent comprising:

providing a composition comprising one or more of androstenone, testosterone, progesterone, or estrogen to attract the rodent to a housing, wherein the one or more of androstenone, testosterone, progesterone, or estrogen are isolated, purified, synthetic, or a combination thereof, wherein the composition further comprises 2-heptanone, 4-heptanone, 3-ethyl-2-heptanone, 2-octanone, 2-nonanone, and 4-nonanone; and receiving the rodent in the housing;

wherein when the composition comprises androstenone and testosterone, the composition attracts at least one adult female rodent; and wherein when the composition comprises progesterone and estrogen, the composition attracts at least one adult male rodent.

2. The method of claim 1, wherein the housing comprises a trap configured to trap or kill the rodent.

3. The method of claim 2, wherein the trap comprises an immobilizing trap, an impaling trap, a snap trap, an asphyxiation trap, an electrocution trap, a catch-and-release trap, a skull-fracturing piston trap, a crushing trap, or a combination thereof.

4. The method of claim 1, wherein the composition comprises about 0.0000001% to 10% of the one or more of androstenone, testosterone, progesterone, or estrogen.

5. The method of claim 1, wherein the composition further comprises a lethal agent, a chemosterilant, or a combination thereof.

6. The method of claim 5, wherein the composition comprises a dose of the lethal agent sufficient to kill or immobilize the rodent.

7. The method of claim 5, wherein the composition comprises the chemosterilant and wherein the chemosterilant comprises mestranol, quinoestrol, diethylstilbestrol, methyl testosterone, 3-cyclopentyl ester of 17α-hexa-1'3'-diynyloestra-1,3,5(10)-trien-17β-ol, α-chlorhydrin, 4-vinylcyclohexene diepoxide, bicalutimide, degarelex, estrogen, flutamide, goserelin, ketoconazol, leuprolide, medroxypregesterone, nilutimide, orntide acetate, triptorelin, or a combination thereof.

8. The method of claim 1, wherein the composition comprises an anticoagulant, a toxicant, or a combination thereof.

9. The method of claim 8, wherein the composition comprises the anticoagulant and wherein the anticoagulant comprises warfarin ((RS)-4-hydroxy-3-(3-oxo-1-phenylbutyl)-2H-chromen-2-one), chlorophacinone (2-[2-(4-chlorophenyl)-1-oxo-2-phenylethyl] indane-1,3-dione), diphacinone (2-(diphenylacetyl)-1H-indene-1,3(2H)-dione), bromadiolone (3-[3-[4-(4-bromophenyl)phenyl]-3-hydroxy-1-phenylpropyl]-2-hydroxychromen-4-one), difethialone (3-[3-[4-(4-bromophenyl)phenyl]-1-tetralinyl]-2-hydroxy-4-thiochromenone), brodifacoum (3-[3-[4-(4-bromophenyl) phenyl]-1,2,3,4-tetrahydronaphthalen-1-yl]-2-hydroxy-chromen-4-one), or a combination thereof.

10. The method of claim 8, wherein the composition comprises the toxicant and wherein the toxicant comprises bromethalin (N-methyl-2,4-dinitro-6-(trifluoromethyl)-N-(2',4',6'-tribromophenyl) aniline), cholecalciferol ((3B,5Z,7E)-9,10-secocholesta-5,7,10(19)-trien-3-ol), zinc phosphide (zinc phosphide/trizinc diphosphide), strychnine (strychnidin-10-one), or a combination thereof.

11. The method of claim 1, wherein the composition further comprises a food bait.

12. A method for attracting a rodent comprising:

providing a composition comprising one or more of androstenone, testosterone, progesterone, or estrogen to attract the rodent to a housing, wherein the one or more of androstenone, testosterone, progesterone, or estrogen are isolated, purified, synthetic, or a combination thereof, wherein the composition further comprises 2-methyl-butyric acid, 3-methyl-butyric acid, heptanal, hexanoic acid, benzaldehyde, benzyl alcohol, 2-phenylacetaldehyde, nonanal, and decanal; and receiving the rodent in the housing;

wherein when the composition comprises androstenone and testosterone, the composition attracts at least one adult female rodent; and wherein when the composition comprises progesterone and estrogen, the composition attracts at least one adult male rodent.

13. The method of claim 12, wherein the housing comprises a trap configured to trap or kill the rodent.

14. The method of claim 13, wherein the trap comprises an immobilizing trap, an impaling trap, a snap trap, an asphyxiation trap, an electrocution trap, a catch-and-release trap, a skull-fracturing piston trap, a crushing trap, or a combination thereof.

15. The method of claim 12, wherein the composition comprises progesterone and estrogen in a ratio of about 100:1.

16. The method of claim 12, wherein the composition comprises about 0.0000001% to 10% of the one or more of androstenone, testosterone, progesterone, or estrogen.

17. The method of claim 12, wherein the composition further comprises a lethal agent, a chemosterilant, or a combination thereof.

18. The method of claim 17, wherein the composition comprises a dose of the lethal agent sufficient to kill or immobilize the rodent.

19. The method of claim 12, wherein the composition comprises an anticoagulant, a toxicant, or a combination thereof.

20. The method of claim 12, wherein the composition further comprises a food bait.

* * * * *